(12) United States Patent
Im et al.

(10) Patent No.: US 10,203,572 B2
(45) Date of Patent: Feb. 12, 2019

(54) LIQUID CRYSTAL DISPLAY INCLUDING PIXEL ELECTRODES HAVING MINUTE BRANCH PORTIONS

(71) Applicant: Samsung Display Co., Ltd., Yongin, Gyeonggi-Do (KR)

(72) Inventors: Wan-Soon Im, Cheonan-si (KR); Sun Hwa Lee, Yongin-si (KR); Yun Seok Lee, Asan-si (KR); Sang-Uk Lim, Yongin-si (KR)

(73) Assignee: Samsung Display Co., Ltd. (KR)

( * ) Notice: Subject to any disclaimer, the term of this patent is extended or adjusted under 35 U.S.C. 154(b) by 20 days.

(21) Appl. No.: 14/788,319

(22) Filed: Jun. 30, 2015

(65) Prior Publication Data

US 2016/0202533 A1 Jul. 14, 2016

(30) Foreign Application Priority Data

Jan. 8, 2015 (KR) ........................ 10-2015-0002978

(51) Int. Cl.
*G02F 1/1343* (2006.01)
(52) U.S. Cl.
CPC ................ *G02F 1/13439* (2013.01); *G02F 2001/134345* (2013.01)
(58) Field of Classification Search
CPC combination set(s) only.
See application file for complete search history.

(56) References Cited

U.S. PATENT DOCUMENTS

| 8,318,270 B2 | 11/2012 | Seong et al. |
| 2010/0231845 A1* | 9/2010 | Seong .................... C09K 19/12 349/183 |

FOREIGN PATENT DOCUMENTS

| KR | 10-2007-0005523 | 1/2007 | |
| KR | 10-2007-0070026 | 7/2007 | |
| KR | 2007-010967 | * 11/2007 | ............... G02F 1/13 |
| KR | 10-2011-0065742 | 6/2011 | |
| KR | 10-2013-0048297 | 5/2013 | |

* cited by examiner

*Primary Examiner* — Lauren Nguyen
(74) *Attorney, Agent, or Firm* — Innovation Counsel LLP (57) ABSTRACT

A liquid crystal display includes a first substrate including first to fourth color pixel areas, first to fourth thin film transistors disposed on the first substrate, and first to fourth pixel electrodes connected to the first to fourth thin film transistors. Each of the first to fourth pixel electrodes includes a cross stem portion including a horizontal stem portion and a vertical stem portion crossing the horizontal stem portion, and minute branch portions extending from the cross stem portion at a predetermined angle with respect to a horizontal direction. A third angle of the minute branch portions of the third pixel electrode is greater than each of first and second angles of the minute branch portions of the respective first and second pixel electrodes. Each of the first and second angles is greater than a fourth angle of the minute branch portions of the fourth pixel electrode.

8 Claims, 8 Drawing Sheets

LIQUID CRYSTAL DISPLAY INCLUDING PIXEL ELECTRODES HAVING MINUTE BRANCH PORTIONS

CROSS-REFERENCE TO RELATED APPLICATION

This application claims priority to and the benefit of Korean Patent Application No. 10-2015-0002978 filed in the Korean Intellectual Property Office on Jan. 8, 2015, the entire contents of which are incorporated herein by reference.

BACKGROUND

(a) Technical Field

The present disclosure generally relates to a liquid crystal display including a white pixel.

(b) Description of the Related Art

A liquid crystal display is one type of flat panel displays that is widely used. The liquid crystal display typically includes two substrates on which an electrode is formed and a liquid crystal layer disposed between the substrates. An electric field is generated over the liquid crystal layer by applying a signal to the electrodes. The electric field determines the arrangement of liquid crystal molecules in the liquid crystal layer and controls polarization of light passing through the liquid crystal layer, thereby allowing images to be displayed on the liquid crystal display.

More specifically, the liquid crystal display may include a thin film transistor array panel and a common electrode panel. The thin film transistor array panel includes a gate line for transmitting a gate signal and a data line for transmitting a data signal, with the gate line and the data line crossing each other. The thin film transistor array panel further includes a thin film transistor connected to the gate line and the data line, and a pixel electrode connected to the thin film transistor. The common electrode panel includes a light blocking member, a color filter, a common electrode, and other elements formed thereon.

Liquid crystal displays may be susceptible to visibility and viewing angle issues. To overcome the above issues, various modes of liquid crystal displays have been developed.

To improve luminance of a liquid crystal display, a method of displaying a white pixel together with red, green and blue pixels has been proposed. However, when the liquid crystal display including the white pixel displays an incarnadine color, a yellowish side defect (whereby the incarnadine color tends towards yellow at a lateral surface) may occur.

The above information disclosed in this Background section is to enhance understanding of the background of the inventive concept and therefore it may contain information that does not form the prior art that is already known in this country to a person of ordinary skill in the art.

SUMMARY

The present disclosure addresses at least the above issues, by providing a liquid crystal device comprising a liquid crystal display including a white pixel, whereby a side yellowish defect is reduced.

According to an exemplary embodiment of the inventive concept, a liquid crystal display is provided. The liquid crystal display includes: a first substrate including a first color pixel area, a second color pixel area, a third color pixel area, and a fourth color pixel area; a first thin film transistor, a second thin film transistor, a third thin film transistor, and a fourth thin film transistor disposed on the first substrate; a first pixel electrode, a second pixel electrode, a third pixel electrode, and a fourth pixel electrode connected to the first thin film transistor, the second thin film transistor, the third thin film transistor, and the fourth thin film transistor, respectively; a second substrate facing the first substrate; a common electrode positioned on the second substrate; and a liquid crystal layer interposed between the first substrate and the second substrate, wherein each of the first pixel electrode, the second pixel electrode, the third pixel electrode, and the fourth pixel electrode includes a cross stem portion including a horizontal stem portion and a vertical stem portion crossing the horizontal stem portion, and a plurality of minute branch portions extending from the cross stem portion at a predetermined angle with respect to a horizontal direction, and wherein a third angle of the plurality of minute branch portions of the third pixel electrode is greater than each of a first angle and a second angle of the plurality of minute branch portions of the respective first pixel electrode and the second pixel electrode, and each of the first angle and the second angle is greater than a fourth angle of the plurality of minute branch portions of the fourth pixel electrode.

In some embodiments, a first color associated with the first color pixel area may be red, a second color associated with the second color pixel area may be green, a third color associated with the third color pixel area may be blue, and a fourth color associated with the fourth color pixel area may be white.

In some embodiments, the pixel electrode may include a first subpixel electrode and a second subpixel electrode.

In some embodiments, each of the first angle and the second angle of the first subpixel electrode may be between about 35 degrees and about 45 degrees, the third angle of the first subpixel electrode may be between about 45 degrees and about 55 degrees, and the fourth angle of the first subpixel electrode may be between about 30 degrees and about 35 degrees.

In some embodiments, the first angle, the second angle, the third angle, and the fourth angle of the second subpixel electrode may be substantially the same.

In some embodiments, each of the first angle, the second angle, the third angle, and the fourth angle of the second subpixel electrode may be between about 40 degrees and about 50 degrees.

In some embodiments, each of the first angle and the second angle of the second subpixel electrode may be between about 35 degrees and about 45 degrees, the third angle of the second subpixel electrode may be between about 45 degrees and about 55 degrees, and the fourth angle of the second subpixel electrode may be between about 30 degrees and about 35 degrees.

In some embodiments, different data voltages may be applied to the first subpixel electrode and the second subpixel electrode.

In some embodiments, a width of the vertical stem portion may be wider than a width of the horizontal stem portion.

According to another embodiment of the inventive concept, a liquid crystal display is provided. The liquid crystal display includes: a first substrate including a first color pixel area, a second color pixel area, a third color pixel area, and a fourth color pixel area; a first thin film transistor, a second thin film transistor, a third thin film transistor, and a fourth thin film transistor disposed on the first substrate; a first pixel electrode, a second pixel electrode, a third pixel electrode, and a fourth pixel electrode connected to the first thin film transistor, the second thin film transistor, the third thin film transistor, and the fourth thin film transistor, respectively; a second substrate facing the first substrate; a common electrode positioned on the second substrate, and a liquid crystal layer interposed between the first substrate and the second substrate, wherein each of the first pixel electrode, the second pixel electrode, the third pixel electrode, and the fourth pixel electrode includes a cross stem portion including a horizontal stem portion and a vertical stem portion crossing the horizontal stem portion, and a plurality of minute branch portions extending from the cross stem portion, and wherein each of the first pixel electrode, the second pixel electrode, and the fourth pixel electrode includes a first subpixel electrode and a second subpixel electrode, and the third pixel electrode includes a unit pixel electrode.

In some embodiments, a first color associated with the first color pixel area may be red, a second color associated with the second color pixel area may be green, a third color associated with the third color pixel area may be blue, and a fourth color associated with the fourth color pixel area may be white.

In some embodiments, an angle of the plurality of minute branch portions of the first subpixel electrode with respect to a horizontal direction may be between about 35 degrees and about 45 degrees, and an angle of the plurality of minute branch portions of the second subpixel electrode with respect to the horizontal direction may be between about 40 degrees and about 50 degrees.

In some embodiments, different data voltages may be applied to the first subpixel electrode and the second subpixel electrode.

In some embodiments, an angle of the plurality of minute branch portions disposed in the third color pixel area with respect to the horizontal direction may be between about 35 degrees and about 45 degrees.

In some embodiments, a width of the vertical stem portion may be wider than a width of the horizontal stem portion.

According to one or more of the above embodiments, a liquid crystal display is formed such that an angle of a plurality of minute branch portions of a first subpixel electrode positioned in a blue pixel area with respect to a horizontal direction is greater than an angle of a plurality of minute branch portions of a first subpixel electrode positioned in a red pixel area and a green pixel area with respect to the horizontal direction. Accordingly, a side yellowish defect (in which color tends toward yellow at a lateral surface) can be reduced. In particular, the side yellowish defect is reduced when an incarnadine color is being displayed.

According to another one or more of the above embodiments, a liquid crystal display includes a first subpixel electrode and a second subpixel electrode formed in red, green, and white pixel areas, and a unit pixel electrode formed in a blue pixel area. Accordingly, a side yellowish defect (in which color tends toward yellow at a lateral surface) may be reduced.

DETAILED DESCRIPTION

The inventive concept will be described more fully herein with reference to the accompanying drawings, in which exemplary embodiments are shown. As those skilled in the art would realize, the embodiments may be modified in various ways without departing from the spirit or scope of the present disclosure.

In the drawings, the thicknesses of layers, films, panels, regions, etc., may be exaggerated for clarity. Like reference numerals designate like elements throughout the specification. It will be understood that when an element such as a layer, film, region, or substrate is referred to as being "on" another element, it can be directly on the other element, or with one or more intervening elements being present. In contrast, when an element is referred to as being "directly on" another element, there are no intervening elements present.

In a vertical alignment (VA) mode liquid crystal display including a white pixel, a side yellowish color deepens as luminance of the white pixel increases. The side yellowish defect occurs because a cell gap of the white pixel is appropriately configured to a green wavelength band in a vertical alignment (VA) mode, and a blue light component having a short wavelength is further weakened when a distance by which light passing through liquid crystal is further increased.

To overcome the side yellowish defect, a liquid crystal display including a blue pixel with a high gamma curve is provided according to an exemplary embodiment of the inventive concept. To form the blue pixel with the high gamma curve, various methods of changing an angle of a pixel electrode for each respective pixel area or changing the structure of a pixel electrode may be used, as described in the following exemplary embodiments.

First, a pixel structure of a liquid crystal display according to different exemplary embodiments will be described below with reference to FIGS. 1, 2, and 3.

Figure 1:
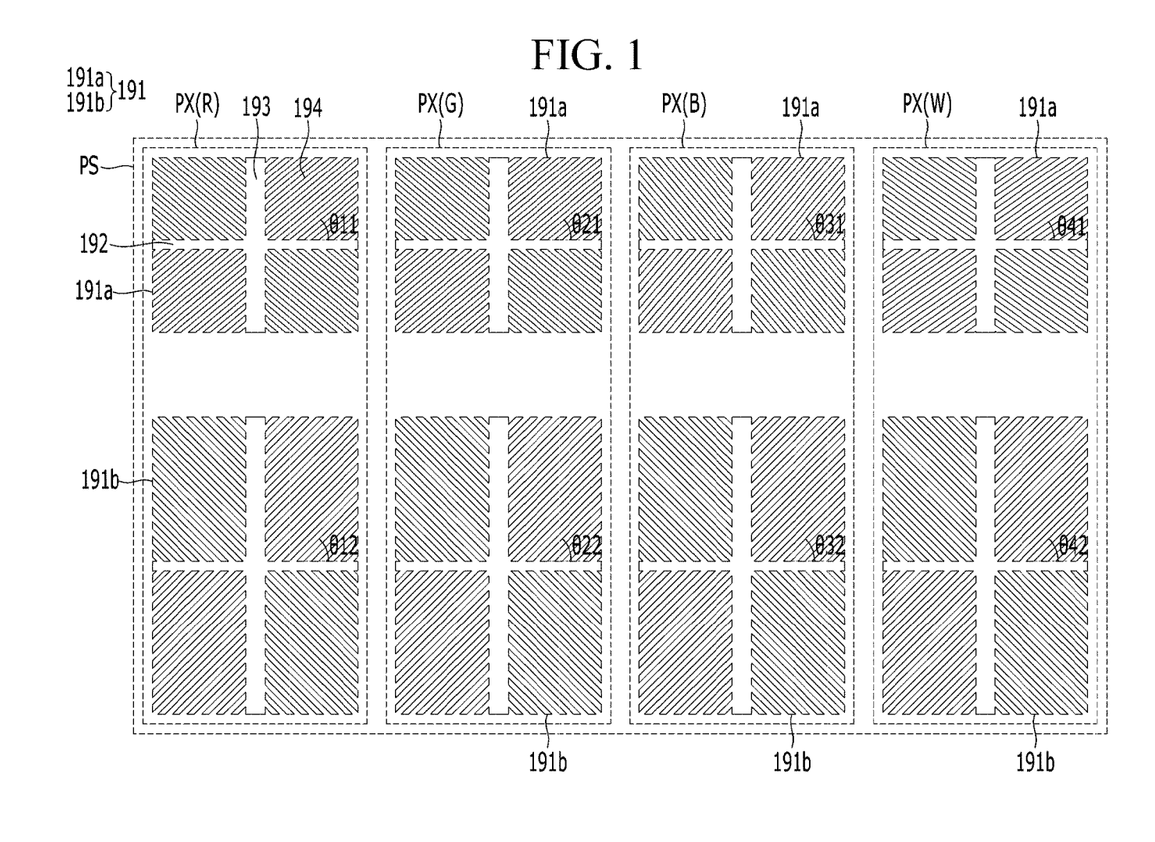
FIG. 1 is a top plan view of a pixel electrode of a pixel group of a liquid crystal display according to a first exemplary embodiment.

FIG. 1 is a top plan view of a pixel electrode of a pixel group unit of a liquid crystal display according to a first exemplary embodiment.

Referring to FIG. 1, a pixel group PS includes a first color pixel area PX(R), a second color pixel area PX(G), a third color pixel area PX(B), and a fourth color pixel area PX(W). A first color associated with the first color pixel area PX(R) may be red, a second color associated with the second color pixel area PX(G) may be green, a third color associated with the third color pixel area PX(B) may be blue, and a fourth color associated with the fourth color pixel area PX(W) may be white. That is, a red filter may be positioned in the first color pixel area PX(R), a green filter may be positioned in the second color pixel area PX(G), a blue filter may be positioned in the third color pixel area PX(B), and a white filter may be positioned in the fourth color pixel area PX(W). The color filters may be formed on a lower display panel or an upper display panel.

A pixel electrode 191 including a first subpixel electrode 191a and a second subpixel electrode 191b is disposed on each of the first color pixel area PX(R), the second color pixel area PX(G), the third color pixel area PX(B), and the fourth color pixel area PX(W).

That is, first to fourth pixel electrodes may be disposed parallel to each other in a row direction in each of the first color pixel area PX(R), the second color pixel area PX(G), the third color pixel area PX(B), and the fourth color pixel area PX(W). Each of the first to fourth pixel electrodes may include the first subpixel electrode 191a and the second subpixel electrode 191b disposed parallel to each other in a column direction.

A data voltage applied to the first subpixel electrode 191a and a data voltage applied to the second subpixel electrode 191b may be different, as described below in further detail.

In the present exemplary embodiment, the first color pixel area PX(R), the second color pixel area PX(G), the third color pixel area PX(B), and the fourth color pixel area PX(W) are disposed parallel to each other. However, the inventive concept is not limited thereto. It is noted that the order of the first color pixel area PX(R), the second color pixel area PX(G), the third color pixel area PX(B), and the fourth color pixel area PX(W) may be changed in other embodiments. Also, the arrangement of the first subpixel electrode 191a and the second subpixel electrode 191b may be modified in various ways.

Each of the pixel areas PX(R), PX(G), and PX(B) may be shaped approximately like a quadrangle.

Each of the first subpixel electrode 191a and the second subpixel electrode 191b of the first pixel electrode 191 positioned in the first color pixel area PX(R) includes four domains.

Each of the first subpixel electrode 191a and the second subpixel electrode 191b is divided into four domains by a cross stem portion including a horizontal stem portion 192 and a vertical stem portion 193 crossing the horizontal stem portion 192.

A first domain is positioned above the horizontal stem portion 192 and on the left of the vertical stem portion 193, and a second domain is positioned above the horizontal stem portion 192 and on the right of the vertical stem portion 193. In addition, a third domain is positioned below the horizontal stem portion 192 and on the right of the vertical stem portion 193, and a fourth domain is positioned below the horizontal stem portion 192 and on the left of the vertical stem portion 193.

Each of the first subpixel electrode 191a and the second subpixel electrode 191b of the second to fourth pixel electrodes 191 that are positioned on the second color pixel area PX(G), the third color pixel area PX(B), and the fourth color pixel area PX(W), respectively also includes four domains.

The horizontal stem portion 192 and a plurality of minute branch portions 194 extending outwardly from the vertical stem portion 193 are positioned at a predetermined angle with respect to a horizontal direction in each of the first domain, the second domain, the third domain, and the fourth domain.

The plurality of minute branch portions 194 positioned in the first domain extend diagonally in a left-upward direction from the horizontal stem portion 192 and the vertical stem portion 193, and the plurality of minute branch portions 194 positioned in the second domain extend diagonally in a right-upward direction from the horizontal stem portion 192 and the vertical stem portion 193. In addition, the plurality of minute branch portions 194 positioned in the third domain extend diagonally in a right-downward direction from the horizontal stem portion 192 and the vertical stem portion 193, and the plurality of minute branch portions 194 positioned in the fourth domain extend diagonally in a left-downward direction from the horizontal stem portion 192 and the vertical stem portion 193.

The plurality of minute branch portions 194 of the second subpixel electrode 191b positioned in each of the first color pixel area PX(R), the second color pixel area PX(G), the third color pixel area PX(B), and the fourth color pixel area PX(W) may form a same angle ($\theta 12$, $\theta 22$, $\theta 32$, and $\theta 42$) between about 40 degrees and about 50 degrees with respect to all horizontal directions as defined by the horizontal stem portion 192.

The plurality of minute branch portions 194 of the first subpixel electrode 191a positioned in each of the first color pixel area PX(R), the second color pixel area PX(G), the third color pixel area PX(B), and the fourth color pixel area PX(W) may be formed having different angles.

For example, a third angle $\theta 31$ of the plurality of minute branch portions 194 of the first subpixel electrode 191a positioned in the third color pixel area PX(B) with respect to a horizontal direction may be greater than each of a first angle $\theta 11$ and a second angle $\theta 21$ of the plurality of minute branch portions 194 of the first subpixel electrode 191a positioned in the respective first color pixel area PX(R) and the second color pixel area PX(G) with respect to a horizontal direction. Also, each of the first angle $\theta 11$ and a second angle $\theta 21$ may be greater than a fourth angle $\theta 41$ of the plurality of minute branch portions 194 of the first subpixel electrode 191a positioned in the fourth color pixel area PX(W) with respect to the horizontal direction.

In the above embodiment, the angles $\theta 11$ and $\theta 21$ of the plurality of minute branch portions 194 of the first subpixel electrode 191a positioned in each of the respective first color pixel area PX(R) and the second color pixel area PX(G) with respect to the horizontal direction may be the same.

Each of the first angle $\theta 11$ and the second angle $\theta 21$ of the first subpixel electrode 191a may be between about 35 degrees and about 45 degrees, the third angle $\theta 31$ of the first subpixel electrode 191a may be between about 45 degrees and about 55 degrees, and the fourth angle $\theta 41$ of the first subpixel electrode 191a may be between about 30 degrees and about 35 degrees.

The liquid crystal display according to the exemplary embodiment of FIG. 1 may be formed such that the third angle $\theta 31$ of the plurality of minute branch portions 194 of the first subpixel electrode 191a positioned in the blue pixel area (PX(B)) is greater than each of the first angle $\theta 11$ and the second angle $\theta 21$ of the plurality of minute branch portions 194 of the respective red pixel area (PX(R)) and the green pixel area (PX(G)). Accordingly, a side yellowish color defect (in which the color tends toward yellow at a lateral surface) is reduced.

In addition, a width of the vertical stem portion 193 may be wider than a width of the horizontal stem portion 192. The pixel electrode 191 of the liquid crystal display may be shaped as a rectangle having a vertical length greater than a horizontal length, such that the width of the vertical stem portion 193 may be greater than the width of the horizontal stem portion 192. Thus, liquid crystal molecules at the vertical stem portion 193 lie in a horizontal direction, thereby improving side visibility.

Next, a pixel electrode of a liquid crystal display according to a second exemplary embodiment will be described.

Figure 2:
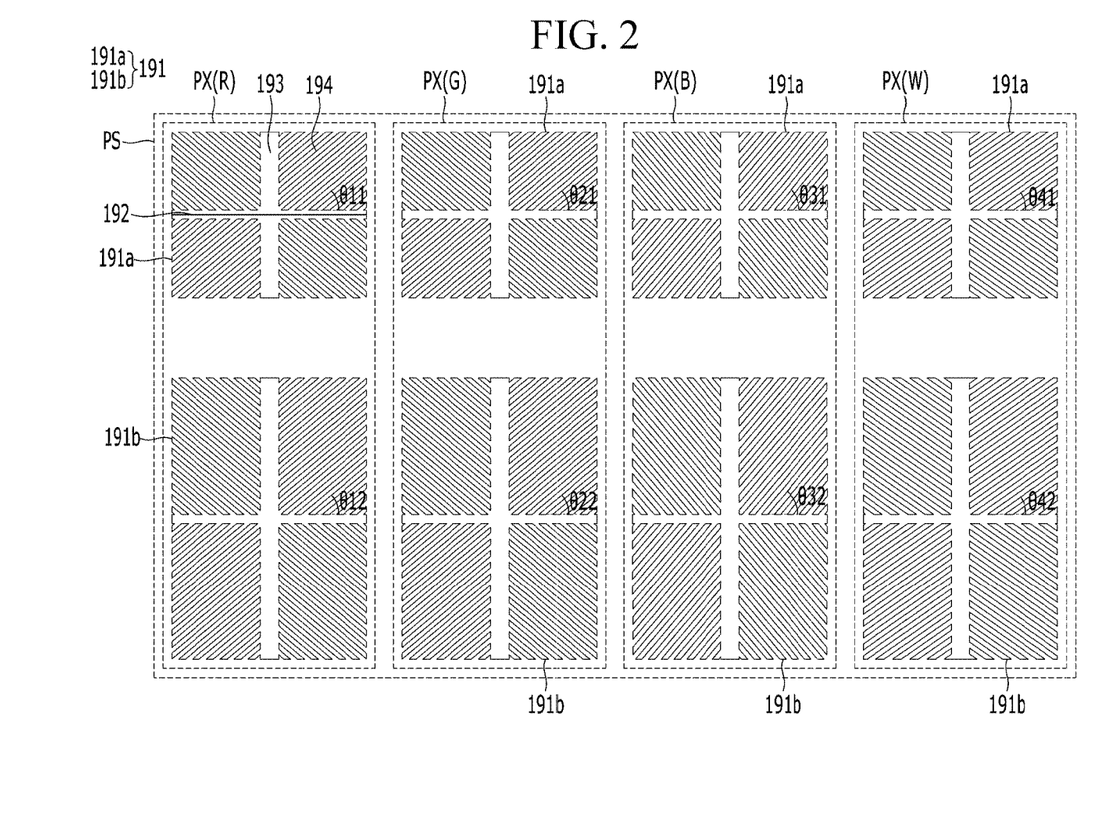
FIG. 2 is a plan view of a pixel electrode of a pixel group of a liquid crystal display according to a second exemplary embodiment.

FIG. 2 is a plan view of a pixel electrode of a pixel group of a liquid crystal display according to the second exemplary embodiment. The pixel electrode of FIG. 2 is similar to the pixel electrode 191 of FIG. 1 except for the angle of the plurality of minute branch portions 194 of the second subpixel electrode 191b. The same reference numerals denote the same constituent elements, and a detailed description of those same constituent elements shall be omitted.

Referring to FIG. 2, the pixel group PS includes the first color pixel area PX(R), the second color pixel area PX(G), the third color pixel area PX(B), and the fourth color pixel area PX(W).

A pixel electrode 191 including the first subpixel electrode 191a and the second subpixel electrode 191b is disposed in each of the first color pixel area PX(R), the second color pixel area PX(G), the third color pixel area PX(B), and the fourth color pixel area PX(W).

In the embodiment of FIG. 2, the first angle θ11 of the plurality of minute branch portions 194 of the first subpixel electrode 191a disposed in the first color pixel area PX(R), and a first angle θ12 of the plurality of minute branch portions 194 of the second subpixel electrode 191b disposed in the first color pixel area PX(R), may be the same and range between about 35 degrees and about 45 degrees.

The second angle θ21 of the plurality of minute branch portions 194 of the first subpixel electrode 191a disposed in the second color pixel area PX(G), and a second angle θ22 of the plurality of minute branch portions 194 of the second subpixel electrode 191b disposed in the second color pixel area PX(G), may be the same and range between about 35 degrees and about 45 degrees.

The third angle θ31 of the plurality of minute branch portions 194 of the first subpixel electrode 191a disposed in the third color pixel area PX(B), and a third angle θ32 of the plurality of minute branch portions 194 of the second subpixel electrode 191b disposed in the third color pixel area PX(B), may be the same and range between about 45 degrees and about 55 degrees.

The fourth angle θ41 of the plurality of minute branch portions 194 of the first subpixel electrode 191a disposed in the fourth color pixel area PX(W), and a fourth angle θ42 of the plurality of minute branch portions 194 of the second subpixel electrode 191b disposed in the fourth color pixel area PX(W), may be the same and range between about 30 degrees and about 35 degrees.

Next, a pixel electrode of a liquid crystal display according to a third exemplary embodiment will be described.

Figure 3:
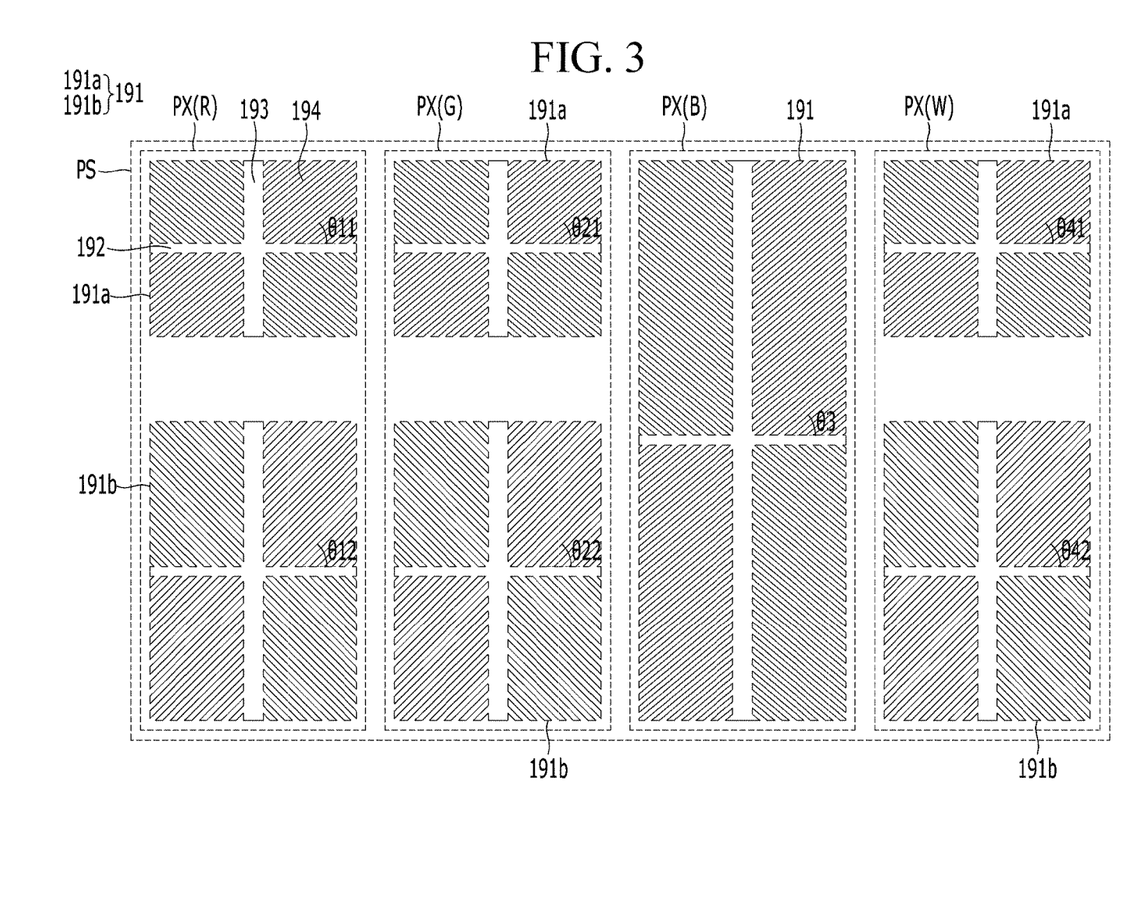
FIG. 3 is a plan view of a pixel electrode of a pixel group of a liquid crystal display according to a third exemplary embodiment.

FIG. 3 is a plan view of a pixel electrode of a pixel group of a liquid crystal display according to the third exemplary embodiment. The pixel electrode of FIG. 3 is similar to the pixel electrode 191 of FIG. 1 except for the structure of the pixel electrode of the third color pixel area (PX(B). The same reference numerals denote the same constituent elements, and a detailed description of those same constituent elements shall be omitted.

Referring to FIG. 3, the pixel group PS includes the first color pixel area PX(R), the second color pixel area PX(G), the third color pixel area PX(B), and the fourth color pixel area PX(W).

A first pixel electrode, a second pixel electrode, and a fourth pixel electrode, each of which includes the first subpixel electrode 191a and the second subpixel electrode 191b, are disposed in the first color pixel area PX(R), the second color pixel area PX(G), and the fourth color pixel area PX(W), respectively. A third pixel electrode of a unit pixel electrode is disposed in the third color pixel area PX(B).

That is, a unit pixel electrode 191 that does not include the first subpixel electrode 191a and the second subpixel electrode 191b may be disposed in the third color pixel area PX(B), unlike in the first color pixel area PX(R), the second color pixel area PX(G), and the fourth color pixel area PX(W).

The first angle θ11 of the plurality of minute branch portions 194 of the first subpixel electrode 191a disposed in the first color pixel area PX(R) may be between about 35 degrees and about 45 degrees, and the first angle θ12 of the plurality of minute branch portions 194 of the second subpixel electrode 191b disposed in the first color pixel area PX(R) may be between about 40 degrees and about 50 degrees.

The second angle θ21 of the plurality of minute branch portions 194 of the first subpixel electrode 191a disposed in the second color pixel area PX(G) may be between about 35 degrees and about 45 degrees, and the second angle θ22 of the plurality of minute branch portions 194 of the second subpixel electrode 191b disposed in the second color pixel area PX(G) may be between about 40 degrees and about 50 degrees.

A third angle θ3 of the plurality of minute branch portions 194 of the pixel electrode 191 disposed in the third color pixel area PX(B) may be between about 35 degrees and about 45 degrees.

The fourth angle θ41 of the plurality of minute branch portions 194 of the first subpixel electrode 191a disposed in the fourth color pixel area PX(W) may be between about 35 degrees and about 45 degrees, and the fourth angle θ42 of the plurality of minute branch portions 194 of the second subpixel electrode 191b disposed in the fourth color pixel area PX(W) may be between about 40 degrees and about 50 degrees.

The red, green, and white pixel areas may include the first subpixel electrode 191a and the second subpixel electrode 191b, and the unit pixel electrode 191 may be formed in the blue pixel area. Accordingly, a side yellowish defect (in which color tends toward yellow at a lateral surface) is reduced.

Figure 4:
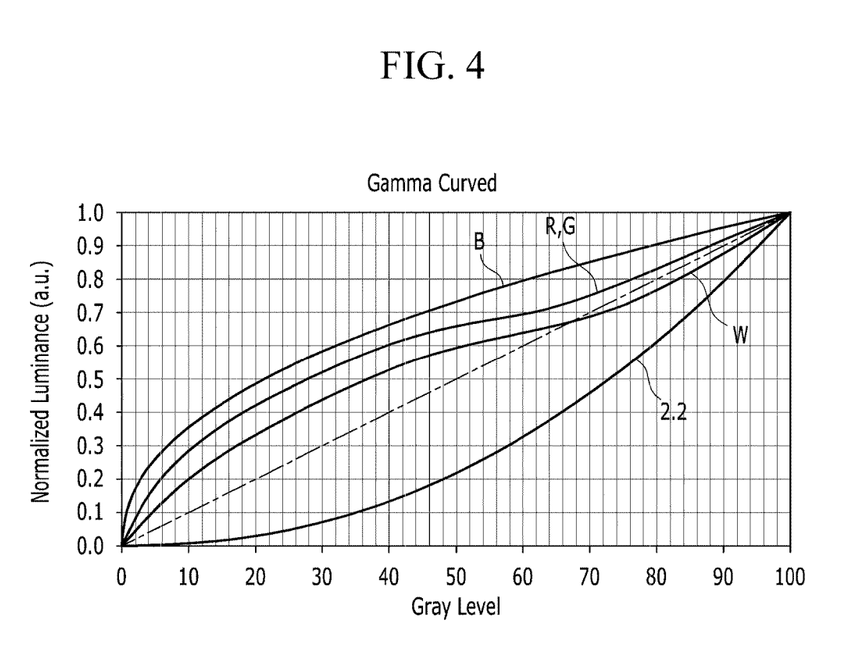
FIG. 4 is a graph of a gamma curve of a liquid crystal display according to an exemplary embodiment.

FIG. 4 is a graph of a gamma curve of a liquid crystal display according to an exemplary embodiment.

Referring to FIG. 4, in a pixel electrode of the exemplary liquid crystal display, a side gamma curve of a blue pixel B may be increased compared with side gamma curves of a red pixel R, a green pixel G, and a white pixel W, so as to reinforce the blue pixel B. Accordingly, a side yellowish defect (in which light yellow is exhibited at a lateral surface) is reduced.

In the liquid crystal display according to the exemplary embodiments of FIGS. 1, 2, and 3, an angle of a pixel electrode for each pixel area may be changed or a structure of a pixel electrode may be changed to form a high gamma curve of a blue pixel, thereby reducing the side yellowish defect.

Next, a liquid crystal display including the pixel electrode illustrated in FIGS. 1 through 3 will be described with reference to FIGS. 5 through 8.

First, signal wires and a pixel arrangement of a liquid crystal display according to an exemplary embodiment and a driving method thereof will be described with reference to FIG. 5.

Figure 5:
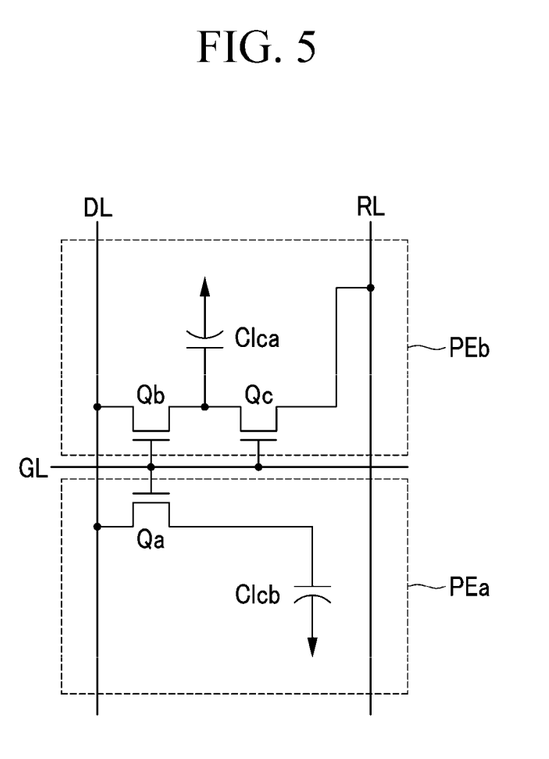
FIG. 5 is an equivalent circuit diagram of a pixel of a liquid crystal display according to an exemplary embodiment.

FIG. 5 is an equivalent circuit diagram of a pixel of a liquid crystal display according to an exemplary embodiment.

Referring to FIG. 5, a pixel PX of the liquid crystal display includes a plurality of signal lines including a gate line GL for transmitting a gate signal, a data line DL for transmitting a data signal, and a dividing reference voltage line RL for transmitting a dividing reference voltage. The pixel PX further includes first, second, and third switching elements Qa, Qb, and Qc connected to the plurality of signal lines, and first and second liquid crystal capacitors Clca and Clcb.

The first and second switching elements Qa and Qb are connected to the gate line GL and the data line DL, respectively, and the third switching element Qc is connected to an output terminal of the second switching element Qb and the dividing reference voltage line RL.

Each of the first switching element Qa and the second switching element Qb is a three-terminal element such as a thin film transistor. A control terminal of each of the first switching element Qa and the second switching element Qb is connected to the gate line GL, an input terminal of each of the first switching element Qa and the second switching element Qb is connected to the data line DL, an output terminal of the first switching element Qa is connected to the second liquid crystal capacitor Clcb, and an output terminal of the second switching element Qb is connected to the first liquid crystal capacitor Clca and an input terminal of the third switching element Qc.

The third switching element Qc is also a three-terminal element such as a thin film transistor. A control terminal of the third switching element Qc is connected to the gate line GL, an input terminal of the third switching element Qc is connected to the first liquid crystal capacitor Clca and the output terminal of the second switching element Qb, and an output terminal of the third switching element Qc is connected to the dividing reference voltage line RL.

When a gate-on signal is applied to the gate line GL, the first switching element Qa, the second switching element Qb, and the third switching element Qc that are connected to the gate line GL are turned on. Accordingly, data voltages applied to the data line DL is applied to a first subpixel electrode PEa and a second subpixel electrode PEb through the first switching element Qa and the second switching element Qb that are turned on. In the above embodiment, the data voltages applied to the first subpixel electrode PEa and the second subpixel electrode PEb are the same, and the first liquid crystal capacitor Clca and the second liquid crystal capacitor Clcb are charged with the same value corresponding to a difference between a common voltage and a data voltage. At the same time, a voltage charged in the second liquid crystal capacitor Clcb is divided through the third switching element Qc that is turned on. Accordingly, a voltage charged in the second liquid crystal capacitor Clcb is lowered by a difference between a common voltage and a division reference voltage. That is, a voltage charged in the first liquid crystal capacitor Clca is higher than the voltage charged in the second liquid crystal capacitor Clcb.

As such, the voltage charged in the first liquid crystal capacitor Clca and the voltage charged in the second liquid crystal capacitor Clcb are different from each other. Since the voltage of the first liquid crystal capacitor Clca and the voltage of the second liquid crystal capacitor Clcb are different, inclination angles of liquid crystal molecules in a first subpixel and a second subpixel are different, and thus luminances in the two subpixel are different. Accordingly, when the voltage of the first liquid crystal capacitor Clca and the voltage of the second liquid crystal capacitor Clcb are appropriately adjusted, an image viewed from the side of the liquid crystal display and an image viewed from the front of the liquid crystal display may be similar, thereby improving side visibility.

In the present exemplary embodiment, in order to differentiate the voltage charged in the first liquid crystal capacitor Clca and the voltage charged in the second liquid crystal capacitor Clcb, the third switching element Qc connected to the first liquid crystal capacitor Clca and the division reference voltage line RL are used. Alternatively, in another exemplary embodiment, the second liquid crystal capacitor Clcb may be connected to a step-down capacitor. In detail, the liquid crystal device may include a third switching element, wherein a first terminal of the third switching element is connected to a step-down gate line, a second terminal of the third switching element is connected to the second liquid crystal capacitor Clcb, and a third terminal of the third switching element is connected to the step-down capacitor so as to charge the step-down capacitor with some of the electric charge stored in the second liquid crystal capacitor Clcb, such that charged voltages between the first liquid crystal capacitor Clca and the second liquid crystal capacitor Clcb are set to be different. In a liquid crystal display according to another exemplary embodiment, the first liquid crystal capacitor Clca and the second liquid crystal capacitor Clcb may be connected to different data lines so as to receive different data voltages, such that charged voltages between the first liquid crystal capacitor Clca and the second liquid crystal capacitor Clcb are set to be different. It should be noted that the charged voltages between the first liquid crystal capacitor Clca and the second liquid crystal capacitor Clcb can be set to be different using various other methods.

Figure 6:
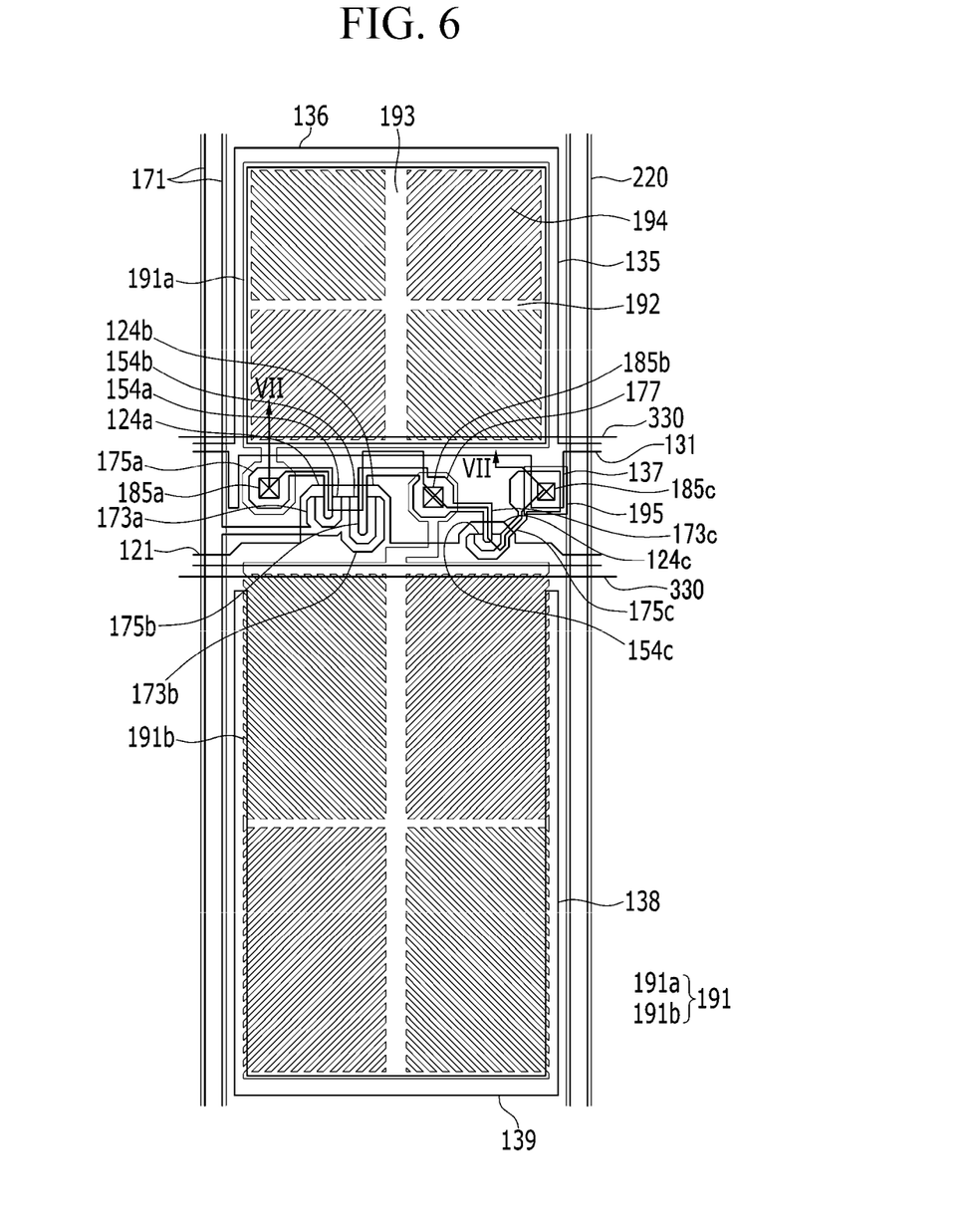
FIG. 6 is a layout view of a pixel of a liquid crystal display according to an exemplary embodiment.
Figure 7:
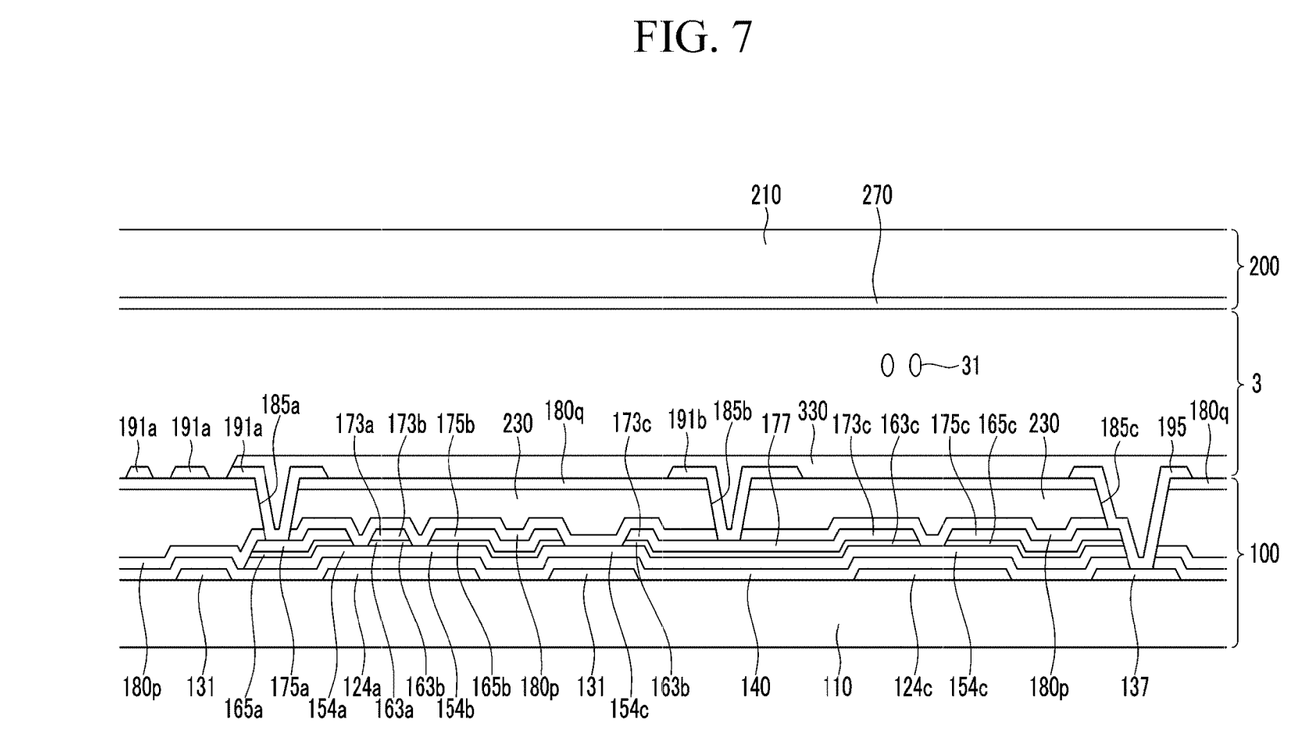
FIG. 7 is a cross-sectional view of the liquid crystal display of FIG. 6 taken along line VII-VII of FIG. 6.

Next, a structure of the liquid crystal display according to the exemplary embodiment of FIG. 5 will be described with reference to FIGS. 6 and 7. FIG. 6 is a layout view of a pixel of a liquid crystal display according to the exemplary embodiment. Specifically, FIG. 6 corresponds to a layout view of a liquid crystal display which may include any of the pixel electrode illustrated in FIGS. 1, 2, and 3. FIG. 7 is a cross-sectional view of the liquid crystal display of FIG. 6 taken along line VII-VII of FIG. 6.

Referring to FIGS. 6 and 7, the liquid crystal display includes a lower display panel 100 and an upper display panel 200 facing each other, a liquid crystal layer 3 disposed between the two display panels 100 and 200, and a pair of polarizers (not shown) attached to an external surface of each of the display panels 100 and 200.

First, the lower display panel 100 will be described below.

Gate conductors are formed on a first substrate 110. The gate conductors include a gate line 121 and a division reference voltage line 131. The first substrate 110 may be formed of transparent glass or plastic.

The gate line 121 includes a wide end portion (not shown) connected with a first gate electrode 124a, a second gate electrode 124b, a third gate electrode 124c, and other layers or with an external driving circuit.

The division reference voltage line 131 includes first storage electrodes 135 and 136 and a reference electrode 137. Second storage electrodes 138 and 139 are positioned overlapping a second subpixel electrode 191b, and are not connected to the division reference voltage line 131.

A gate insulating layer 140 is formed on the gate line 121 and the division reference voltage line 131.

A first semiconductor 154a, a second semiconductor 154b, and a third semiconductor 154c are formed on the gate insulating layer 140. Each of the first semiconductor 154a, second semiconductor 154b, and third semiconductor 154c may be formed having an island-type configuration.

A plurality of ohmic contacts 163a, 165a, 163b, 165b, 163c, and 165c are formed on the semiconductors 154a, 154b, and 154c.

Data conductors are formed on the ohmic contacts 163a, 165a, 163b, 165b, 163c, and 165c, and the gate insulating layer 140. The data conductors include a plurality of data lines 171 including a first source electrode 173a, a second source electrode 173b, a third source electrode 173c, a first drain electrode 175a, a second drain electrode 175b, and a third drain electrode 175c.

The data conductors and the semiconductors, and the ohmic contacts positioned therebelow, may be simultaneously formed using one mask.

The data line 171 includes a wide end portion (not shown) connected with other layers or with an external driving circuit.

The first gate electrode 124a, first source electrode 173a, and first drain electrode 175a, together with the first semiconductor 154a, collectively constitute a first thin film transistor (TFT) Qa. A channel of the first thin film transistor Qa is formed on the semiconductor 154a between the first source electrode 173a and the first drain electrode 175a. Similarly, the second gate electrode 124b, second source electrode 173b, and second drain electrode 175b, together with the second semiconductor 154b, collectively constitute a second thin film transistor Qb. A channel of the second thin film transistor Qb is formed on the semiconductor 154b between the second source electrode 173b and the second drain electrode 175b. Likewise, the third gate electrode 124c, third source electrode 173c, and third drain electrode 175c, together with the third semiconductor 154c, collectively constitute a third thin film transistor Qc. A channel of the third thin film transistor Qc is formed on the semiconductor 154c between the third source electrode 173c and the third drain electrode 175c.

The second drain electrode 175b is connected to the third source electrode 173c and includes a wide extension portion 177.

A first passivation layer 180p is formed on the data conductors 171, 173c, 175a, 175b, and 175c, and on an exposed portion of the semiconductors 154a, 154b, and 154c. The first passivation layer 180p may include an inorganic insulating layer such as silicon nitride or silicon oxide. The first passivation layer 180p can prevent pigments of the color filter 230 from being introduced onto the exposed portions of the semiconductors 154a, 154b, and 154c.

A color filter 230 is formed on the first passivation layer 180p. The color filter 230 extends in a vertical direction along adjacent data lines. A first light blocking member 220 is positioned on the first passivation layer 180p and the data line 171, and on an edge of the color filter 230.

The first light blocking member 220 extends along the data line 171 and is positioned between neighboring color filters 230. A width of the first light blocking member 220 may be wider than a width of the data line 171. Specifically, the width of the first light blocking member 220 may be wider than the width of the data line 171 such that the first light blocking member 220 prevents light emitted from an external source from being reflected off a surface of the data line 171 (since the data line 171 may be formed of a metal). It is noted that light reflected off the surface of the data line 171 may interfere with light passing through the liquid crystal layer 3. Accordingly, the first light blocking member 220 can help improve a contrast ratio of the exemplary liquid crystal display and prevent degradation of the contrast ratio.

A second passivation layer 180q is formed on the color filter 230 and the first light blocking member 220.

The second passivation layer 180q may include an inorganic insulating layer such as silicon nitride or silicon oxide. The second passivation layer 180q can prevent the color filter 230 from lifting off. The second passivation layer 180q can also protect the liquid crystal layer 3 from contamination due to an organic material (such as a solvent introduced from the color filter 230). Accordingly, errors (such an afterimage that may be caused during screen driving) can be prevented.

A first contact hole 185a and a second contact hole 185b are formed in the first passivation layer 180p and the second passivation layer 180q. The first drain electrode 175a and the second drain electrode 175b are exposed through the first contact hole 185a and the second contact hole 185b, respectively.

A third contact hole 185c is formed in the first passivation layer 180p, the second passivation layer 180q, and the gate insulating layer 140. A portion of the reference electrode 137 and a portion of the third drain electrode 175c are exposed through the third contact hole 185c. A connecting member 195 is formed covering the third contact hole 185c. The connecting member 195 electrically connects the reference electrode 137 and the third drain electrode 175c that are exposed through the third contact hole 185c.

A plurality of pixel electrodes 191 are formed on the second passivation layer 180q. The pixel electrodes 191 are separated from each other across the gate line 121. The pixel electrodes 191 include the first subpixel electrode 191a and the second subpixel electrode 191b neighboring each other in a column direction with respect to the gate line 121. The pixel electrode 191 may be formed of a transparent conductive material such as ITO or IZO, or a reflective metal such as aluminum, silver, chromium or an alloy thereof.

The pixel electrode 191 including the first subpixel electrode 191a and the second subpixel electrode 191b may be disposed in the first color pixel area PX(R), the second color pixel area PX(G), the third color pixel area PX(B), and the fourth color pixel area PX(W), as illustrated in FIGS. 1 and 2. In some embodiments, the pixel electrode 191 may be disposed in the first color pixel area PX(R), the second color pixel area PX(G), and the fourth color pixel area PX(W), as illustrated in FIG. 3.

The first subpixel electrode 191a and the second subpixel electrode 191b are physically and electrically connected to the first drain electrode 175a and the second drain electrode 175b through the first contact hole 185a and the second contact hole 185b, respectively, and configured to receive a data voltage from the first drain electrode 175a and the second drain electrode 175b. A portion of the data voltage applied to the second drain electrode 175b is divided through the third source electrode 173c, and an amplitude of a voltage applied to the first subpixel electrode 191a may be higher than an amplitude of a voltage applied to the second subpixel electrode 191b.

The first subpixel electrode 191a and the second subpixel electrode 191b, to which the data voltage is applied, may generate an electric field together with a common electrode 270 of the upper display panel 200. The electric field determines a direction of liquid crystal molecules of the liquid crystal layer 3 between the two electrodes 191 and 270. Luminance of light passing through the liquid crystal layer 3 is changed according to the direction of the liquid crystal molecules.

A second light blocking member 330 is positioned on the pixel electrode 191. The second light blocking member 330 is formed covering a region in which the first transistor Qa, the second transistor Qb, the third transistor Qc and the first to third contact holes 185a, 185b, and 185c are positioned. The second light blocking member 330 extends in the same direction as the gate line 121 to overlap a portion of the data line 171. The second light blocking member 330 may overlap at least portions of the two data lines 171 positioned next to opposite sides of a pixel area, so as to prevent light leakage that may occur around the data line 171 and the gate line 121. The second light blocking member 330 may also prevent light leakage in a region in which the first transistor Qa, the second transistor Qb, and the third transistor Qc are positioned.

Prior to forming the second light blocking member 330, the first passivation layer 180p, the color filter 230, and the second passivation layer 180q may be positioned in a region in which the first transistor Qa, the second transistor Qb, the third transistor Qc, and the first to third contact holes 185a, 185b, and 185c are positioned, such that the positions of the first transistor Qa, the second transistor Qb, the third transistor Qc, and the first to third contact holes 185a, 185b, and 185c can be easily distinguished.

Next, the upper display panel 200 will be described.

The common electrode 270 is formed on an insulation substrate 210.

An upper alignment layer (not shown) is formed on the common electrode 270. The upper alignment layer may be a vertical alignment layer or an alignment layer that is photo-aligned using a photopolymerization material.

A polarizer (not shown) may be disposed on an external surface of each of the two display panels 100 and 200. Transmissive axes of the two polarizers may be perpendicular to each other, and one of the transmissive axes may be parallel to the gate line 121. In some alternative embodiments, the polarizer may be disposed on an external surface of only one of the display panels 100 and 200.

The liquid crystal layer 3 has negative dielectric anisotropy and a major axis of liquid crystal molecules of the liquid crystal layer 3 may be aligned perpendicular to surfaces of the two display panels 100 and 200 when an electric field is absent. Accordingly, incident light does not pass through a crossed polarizer and is blocked when an electric field is absent.

As described above, the first subpixel electrode 191a and the second subpixel electrode 191b, to which a data voltage is applied, generate an electric field together with the common electrode 270 of the upper display panel 200, such that liquid crystal molecules of the liquid crystal layer 3 lie in a direction parallel to the surfaces of the two electrodes 191 and 270. In particular, luminance of light passing through the liquid crystal layer 3 is changed according to an inclination degree of the liquid crystal molecules when the electric field is present.

Figure 8:
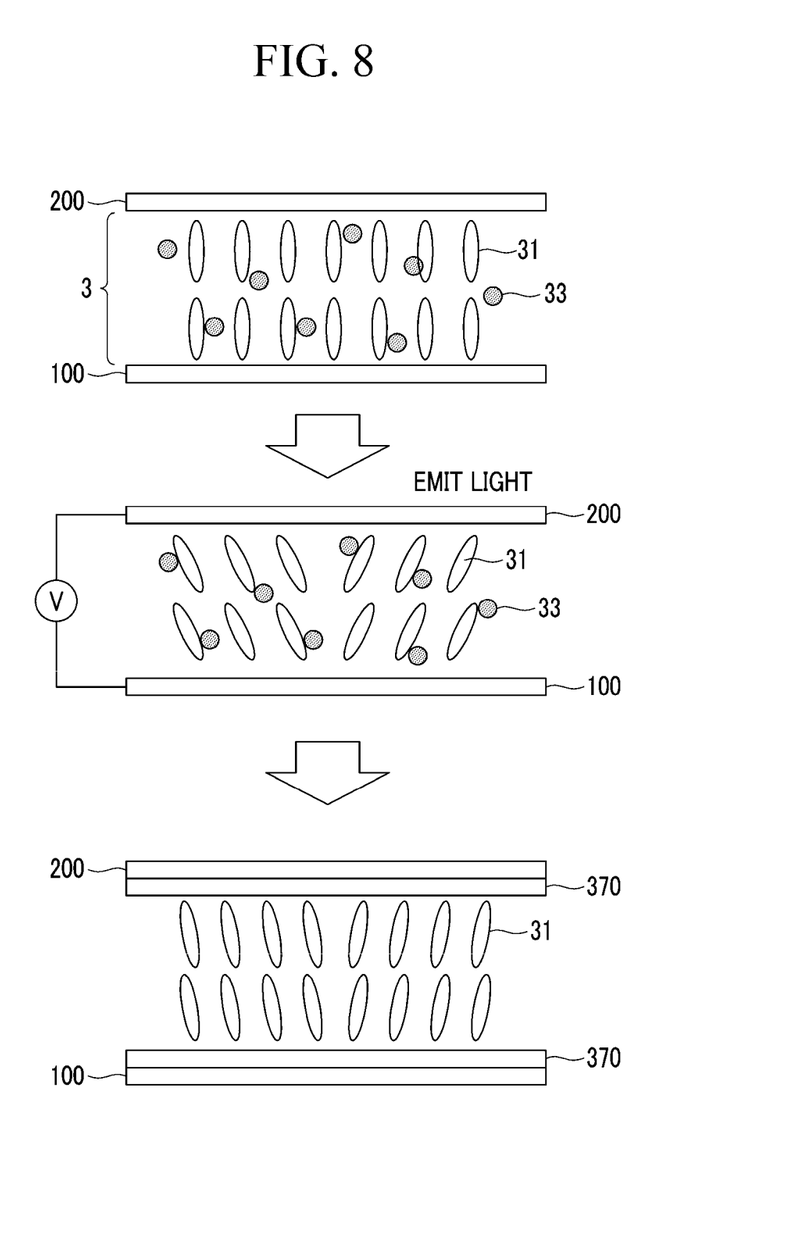
FIG. 8 illustrates a method for obtaining a pretilt of the liquid crystal molecules using a prepolymer that is polymerized by light.

Next, a method of aligning liquid crystal molecules 31 with pretilt will be described below.

FIG. 8 illustrates a method for obtaining a pretilt of liquid crystal molecules using a prepolymer that is polymerized by light.

First, a prepolymer 33 is injected between the two display panels 100 and 200 together with a liquid crystal material. The prepolymer 33 may be a monomer that can ben hardened via polymerization using light. For example, the prepolymer 33 may be a reactive mesogen that undergoes polymerization using light such as ultraviolet rays.

Next, a data voltage is applied to the first subpixel electrode 191a and the second subpixel electrode 191b, and a common voltage is applied to the common electrode 270 of the upper display panel 200, so as to generate an electric field in the liquid crystal layer 3 between the two display panels 100 and 200. As described above, the electric field controls the direction of the liquid crystal molecules 31 of the liquid crystal layer 3 such that the liquid crystal molecules 31 are inclined in a direction parallel to a length direction of minute branch portions 194. Accordingly, there are a total of four inclination directions of the liquid crystal molecules 31 in one pixel.

After an electric field is formed in the liquid crystal layer 3, light such as ultraviolet rays is emitted to polymerize the prepolymer 33 to form a polymer 370, as shown in FIG. 8. The polymer 370 is formed in contact with the display panels 100 and 200. The alignment direction of the liquid crystal molecules 31 have a pretilt corresponding to the direction parallel to a length direction of minute branch portions 194 by the polymer 370. Accordingly, when a voltage is not applied to the field generating electrodes 191 and 270, the liquid crystal molecules 31 have a pretilt corresponding to four different directions.

While the inventive concept has been described in connection with what is presently considered to be exemplary embodiments, it is to be understood that the inventive concept is not limited to the disclosed embodiments, but, on the contrary, is intended to cover various modifications and equivalent arrangements included within the spirit and scope of the appended claims.

What is claimed is:

1. A liquid crystal display comprising:
   a first substrate including a first color pixel area, a second color pixel area, a third color pixel area, and a fourth color pixel area;
   a first thin film transistor, a second thin film transistor, a third thin film transistor, and a fourth thin film transistor disposed on the first substrate;
   a first pixel electrode, a second pixel electrode, a third pixel electrode, and a fourth pixel electrode connected to the first thin film transistor, the second thin film transistor, the third thin film transistor, and the fourth thin film transistor, respectively;
   a second substrate facing the first substrate;
   a common electrode positioned on the second substrate; and
   a liquid crystal layer interposed between the first substrate and the second substrate,
   wherein each of the first pixel electrode, the second pixel electrode, the third pixel electrode, and the fourth pixel electrode comprises a cross stem portion including a horizontal stem portion and a vertical stem portion crossing the horizontal stem portion, and a plurality of minute branch portions extending from the cross stem portion at a predetermined angle,
   wherein the first pixel electrode includes a first subpixel electrode and a second subpixel electrode, the second pixel electrode includes a first subpixel electrode and a second subpixel electrode, the third pixel electrode includes a first subpixel electrode and a second subpixel electrode, the fourth pixel electrode includes a first subpixel electrode and a second subpixel electrode,
   wherein a third angle of the plurality of minute branch portions of the first subpixel electrode of the third pixel electrode is greater than each of a first angle and a second angle of the plurality of minute branch portions of the first subpixel electrode of the first pixel electrode, and each of the first angle and the second angle of the plurality of minute branch portions of the first subpixel electrode of the first pixel electrode is greater than a fourth angle of the plurality of minute branch portions of the first subpixel electrode of the fourth pixel electrode, wherein the third angle of the plurality of minute branch portions of the first subpixel electrode of the third pixel electrode is greater than each of a first angle and a second angle of the plurality of minute branch portions of the first subpixel electrode of the second pixel electrode, and each of the first angle and the second angle of the plurality of minute branch portions of the first subpixel electrode of the second pixel electrode is greater than the fourth angle of the plurality of minute branch portions of the first subpixel electrode of the fourth pixel electrode wherein a first color associated with the first color pixel area is red, a second color associated with the second color pixel area is green, a third color associated with the third color pixel area is blue, and a fourth color associated with the fourth color pixel area is white, and wherein angles including the predetermined angle, the first angle, the second angle, the third angle, and the fourth angle are measured with respect to a direction in which gate lines extend; and wherein all the angles are measured at the same distance from the gate lines and data lines in each pixel.

2. The liquid crystal display of claim 1, wherein the first angle and the second angle of the plurality of minute branch portions of the first subpixel electrode of the first pixel electrode are the same as the first angle and the second angle of the plurality of minute branch portions of the first subpixel electrode of the second pixel electrode.

3. The liquid crystal display of claim 1, wherein each of the first angle and the second angle of the first subpixel electrode is between about 35 degrees and about 45 degrees, the third angle of the first subpixel electrode is between about 45 degrees and about 55 degrees, and the fourth angle of the first subpixel electrode is between about 30 degrees and about 35 degrees.

4. The liquid crystal display of claim 3, wherein the first angle, the second angle, the third angle, and the fourth angle of the second subpixel electrode are substantially the same.

5. The liquid crystal display of claim 4, wherein each of the first angle, the second angle, the third angle, and the fourth angle of the second subpixel electrode is between about 40 degrees and about 50 degrees.

6. The liquid crystal display of claim 3, wherein each of the first angle and the second angle of the second subpixel electrode is between about 35 degrees and about 45 degrees, the third angle of the second subpixel electrode is between about 45 degrees and about 55 degrees, and the fourth angle of the second subpixel electrode is between about 30 degrees and about 35 degrees.

7. The liquid crystal display of claim 1, wherein different data voltages are applied to the first subpixel electrode and the second subpixel electrode.

8. The liquid crystal display of claim 1, wherein a width of the vertical stem portion is wider than a width of the horizontal stem portion.

* * * * *